US008321738B2

(12) United States Patent
Liu

(10) Patent No.: US 8,321,738 B2
(45) Date of Patent: Nov. 27, 2012

(54) METHOD, SYSTEM AND DEVICE FOR RETRANSMITTING DATA

(75) Inventor: Jianhua Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 706 days.

(21) Appl. No.: 12/498,460

(22) Filed: Jul. 7, 2009

(65) Prior Publication Data

US 2009/0282312 A1    Nov. 12, 2009

Related U.S. Application Data

(63) Continuation of application No. PCT/CN2008/070060, filed on Jan. 9, 2008.

(30) Foreign Application Priority Data

Jan. 9, 2007    (CN) .......................... 2007 1 0004571

(51) Int. Cl.
*G08C 25/02* (2006.01)
*H04L 1/18* (2006.01)
*H03M 13/00* (2006.01)

(52) U.S. Cl. ....................................... 714/748; 714/751
(58) Field of Classification Search .................. 714/748, 714/751
See application file for complete search history.

(56) References Cited

U.S. PATENT DOCUMENTS

| 4,312,065 A | * | 1/1982 | Ulug ............................. 370/230 |
| 5,477,550 A | * | 12/1995 | Crisler et al. ................. 714/748 |
| 5,910,970 A | * | 6/1999 | Lu ................................. 375/377 |
| 6,460,154 B1 | * | 10/2002 | Duxbury ........................ 714/751 |
| 7,003,710 B2 | * | 2/2006 | Tomaru et al. ................. 714/751 |
| 7,143,178 B2 | | 11/2006 | Glazko et al. |
| 7,434,133 B2 | | 10/2008 | Hong et al. |
| 7,813,322 B2 | * | 10/2010 | Laroia et al. .................. 370/333 |
| 7,904,779 B2 | * | 3/2011 | Belogolovy et al. .......... 714/751 |
| 2002/0041596 A1 | | 4/2002 | Rezaiifar et al. |
| 2006/0023713 A1 | | 2/2006 | Choi et al. |
| 2008/0063007 A1 | * | 3/2008 | Christiaens et al. .......... 370/458 |
| 2009/0138775 A1 | * | 5/2009 | Christiaens et al. .......... 714/748 |

FOREIGN PATENT DOCUMENTS

| CN | 1301448 A | 6/2001 |
| CN | 1440602 A | 9/2003 |
| EP | 1580917 A2 | 9/2005 |

(Continued)

OTHER PUBLICATIONS

1st Office Action in corresponding European Application No. 08700084.0 (Dec. 23, 2010).

(Continued)

*Primary Examiner* — Joseph D Torres
(74) *Attorney, Agent, or Firm* — Leydig, Voit & Mayer, Ltd.

(57) ABSTRACT

A method, system, and device for retransmitting data are provided. The method includes the following steps. In Step A, a receiving device detects a received frame that bears data, determines that the data frame is damaged, and judges whether the number of the damaged frames meets a set retransmission threshold value in a set range or not. If yes, Step B is performed. Otherwise, Step C is performed. In Step B, the receiving device sends a retransmission request to a sending device, the sending device retransmits the frame, and the process turns to Step A. In Step C, the receiving device performs a decoding processing on the data borne in the damaged frame that is received.

13 Claims, 5 Drawing Sheets

FOREIGN PATENT DOCUMENTS

| | | |
|---|---|---|
| WO | WO 2005/074195 A1 | 8/2005 |
| WO | WO 2006/073323 A1 | 7/2006 |

OTHER PUBLICATIONS

European Patent Office, Examination Report in European Patent Application No. 08700084.0 (Jun. 24, 2010).

State Intellectual Property Office of the People'S Republic of China, English Translation of Written Opinion of the International Searching Authority in International Patent Application No. PCT/CN2008/070060 (Apr. 17, 2008).

Broadcom, "G.gen: VDSL: ADSL Retransmission mode in DSL," ITU—Telecommunication Standardization Sector, Study Group 15, Temporary Document CD-067, Original: English, Denver, Colorado (Sep. 25-29, 2006).

Brown, "Final Draft text for G.993.2 (for republication)," Texas Instruments USA, Study Group 15, Geneva (Feb. 6-17, 2006).

Aware, Bellsouth, "VDSL2: Packet Retransmission Protocols in VDSL2 transceivers," ITU—Telecommunication Standardization Sector, Study Group 15, Temporary Document GB-063, Original: English, Ghent, Belgium (Jun. 12-16, 2006).

Broadcom, "ADSL:G.vdsl: Control parameters and performance of a retransmission scheme," ITU—Telecommunication Standardization Sector, Study Group 15—Contribution 90, Study Period 2005-2008, COM 15-C 90-E (Oct. 2006).

Aware, "VDSL2: Proposal for a VDSL2 Data Retransmission Protocol," ITU—Telecommunication Standardization Sector, Study Group 15—Contribution 116, Study Period 2005-2008, COM 15-C 116-E (Oct. 2006).

\* cited by examiner

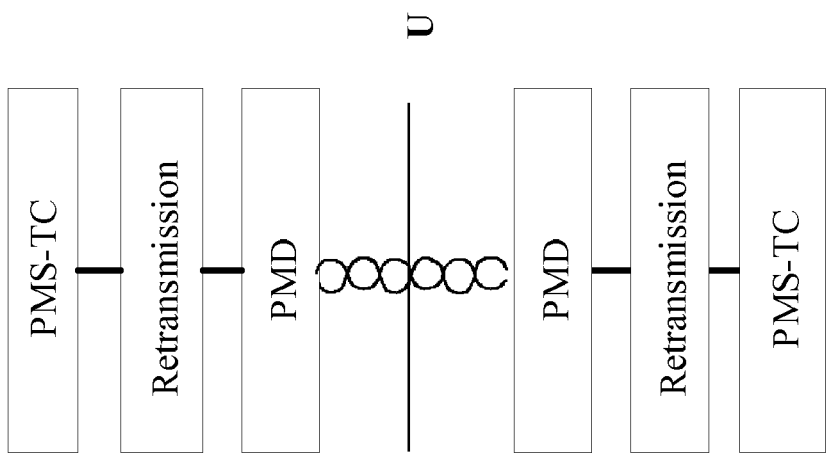
FIG. 3
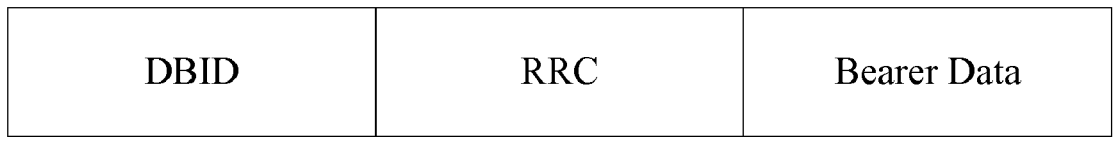
FIG. 4
| DMT_ID | | | | | | | |
|---|---|---|---|---|---|---|---|
| DBID | | | | | | | |
| RFlag | | | | | | | |
| Data Block | | | | | | | |
FIG. 5

| DMT_ID | | | | | | | |
|---|---|---|---|---|---|---|---|
| DBID | | | | | | | |
| Degraded flag | | | | | | | |
| Data Block | | | | | | | |

| 0 | 1 | 0 | 0 | 0 | 0 | 1 | 0 | 0 | 1 |
|---|---|---|---|---|---|---|---|---|---|

| DMT_ID | | | | | | | |
|---|---|---|---|---|---|---|---|
| DBID | | | | | | | |
| Degraded flag | | | | | | | |
| Data Block | | | | | | | |

METHOD, SYSTEM AND DEVICE FOR RETRANSMITTING DATA

CROSS-REFERENCE TO RELATED APPLICATIONS

This application is a continuation of International Patent Application No. PCT/CN2008/070060, filed Jan. 9, 2008, which claims priority to Chinese Patent Application No. 200710004571.2, filed Jan. 9, 2007, both of which are hereby incorporated by reference in their entirety.

FIELD OF THE TECHNOLOGY

The present invention relates to technologies of receiving/sending data in the communication system, and more particularly to a method, system, and device for retransmitting data.

BACKGROUND

Digital subscriber line (DSL) is a high-speed transmission technology for data transmission via a telephone twisted pair, i.e., an unshielded twisted pair (UTP). The DSL includes an asymmetrical digital subscriber line (ADSL), a very-high-bit-rate digital subscriber line (VDSL), and a single-pair high-bit-rate digital subscriber line (SHDSL), etc.

In the various digital subscriber line (xDSL) technologies, in addition to the DSLs based on baseband transmission such as Integrated Services Digital Network DSL (IDSL) and SHDSL, the DSL based on passband transmission makes the DSL and plain old telephone service (POTS) coexist on the same twisted pair using frequency division multiplexing technology. The DSL occupies a high frequency band, the POTS occupies a baseband below 4 KHz. The POTS signal and the DSL signal are split or combined through a splitter. The xDSL based on passband transmission conducts modulation and demodulation using the discrete multi-tone (DMT) modulation technology. The DMT modulation is another name of the orthogonal frequency division multiplexing (OFDM) modulation at the DSL domain. A system for providing multiple DSL access is referred to as a DSL access multiplexer (DSLAM), and a system connection relation thereof is shown in FIG. 1.

A subscriber end xDSL transceiver, i.e., a subscriber end DSLAM 120, includes a subscriber end transceiver unit 121 and a splitter 122. In an uplink direction, the subscriber end transceiver unit 121 receives a DSL signal from a computer 110, amplifies the received signal, and sends the amplified DSL signal to the splitter 122. The splitter 122 combines the DSL signal from the subscriber end transceiver unit 121 and a POTS signal from a telephone terminal 130. The combined signal is transmitted through a multiplexing UTP 140, and received by a splitter 151 in an office end xDSL transceiver 150, i.e., a DSLAM 150. The splitter 151 splits the received signal, sends the POTS signal to a public switched telephone network (PSTN) 160, and sends the DSL signal to an office end transceiver unit 152 of the office end xDSL transceiver 150. The office end transceiver unit 152 subsequently amplifies the received DSL signal and sends it to a network management system (NMS) 170. In a downlink direction, the signal is transmitted in an order reverse to the above.

Currently, the DSL technology, especially the VDSL2 technology, is widely applied to the transmission of triple play services, such as the Internet protocol television (IPTV) services. The triple play services require a lower packet loss ratio than the conventional data services. The DSL device employs noise margin and trellis coding techniques to overcome the negative impact of random noises on the transmission of packets that carry data. When the DSL runs in a twisted-pair environment with multi-pulse noises, i.e., runs in the system as shown in FIG. 1, the forward error correction (FEC) coding and interleaving techniques are adopted to provide protection against impulse noises for the transmitted data. That is, the data is obtained from the received packet by FEC coding and interleaving, and decoding, this method is called impulse noise protection (INP). However, with the development of the DSL technology, the transmission rate of the packet becomes increasingly higher, so that in order to protect a channel that bears packets at a high transmission rate against impulse noises, the interleaving memory required at the DSL device is increased. Meanwhile, as the triple play services have a higher requirement on the packet loss ratio, more interleaving memory at the DSL device is needed. The increase of the interleaving memory at the DSL device not only raises the cost of the DSL device, but also makes it difficult for the DSL device to bear services requiring a small delay such as Voice over IP (VOIP) services at the same time.

Therefore, in order to reduce the negative impact of the impulse noises so as to implement a drop in the bit error rate or packet loss ratio, when the DSL device runs in a multi-pulse noise environment, a retransmission technique may be introduced. The most famous retransmission technique is a packet retransmission technique based on transmission control protocol/Internet protocol (TCP/IP), and the basic process thereof is described as follows.

First, a sending end encapsulates data into a TCP packet and assigns a packet ID for the TCP packet, performs a cyclic redundancy check (CRC) computing on the TCP packet and attaches a computed CRC value at a particular position of the TCP packet, then sends the TCP packet to a receiving end, and meanwhile saves the TCP packet in the cache for potential retransmission.

Afterward, the receiving end receives the TCP packet and caches it, then performs a CRC on the TCP packet, and compares an obtained CRC value with the CRC value carried in the TCP packet. If it is found that the packet does not have an error, the receiving end receives the TCP packet. If it is found that the packet has an error, the receiving end sends a retransmission request carrying the packet ID to the sending end and also discards the TCP packet.

On receiving the retransmission request, the sending end acquires from the cache the TCP packet corresponding to the packet ID carried in the request, and sends the TCP packet to the receiving end again.

Finally, the receiving end correctly receives the retransmitted TCP packet without error.

The basic principle of retransmission is merely illustrated above, and other contents are recorded in the TCP/IP. Such contents only relate to how to improve the retransmission efficiency, so the details will not be given herein again.

The following defects exist in introducing the above retransmission mechanism at the DSL device running in a multi-pulse noise environment. When the packet ID is damaged, it is impossible to point out which packets need to be retransmitted, so that the retransmission mechanism may only be used in circumstances with a few packet transmission errors. In the circumstances with a few packet transmission errors, the packet ID only takes up a very small part of the packet, and the probability that the packet ID goes wrong is small. However, in circumstances with serious packet transmission errors, i.e., the content of the whole packet is almost damaged, the probability that the packet ID is damaged is high, and in such circumstances, the retransmission mechanism faces a severe problem. When the DSL device transmits data in a multi-pulse noise environment, one impulse noise usually damages the packet within a DMT symbol that is transmitted by the DSL device, and one impulse noise usually damages several DMT symbols transmitted consecutively. As the data in the packet carried by one DMT symbol amounts to thousands of bits, the reliability of initiating retransmission through the packet ID in such environment is poorer.

In addition, the above retransmission mechanism may be introduced at the DSL device running in the multi-pulse noise environment by the following two means. One is to configure the retransmission mechanism in a layer below the FEC coding layer and the interleaving layer at the DSL device. The other is to configure the retransmission mechanism in a layer above the FEC coding layer and the interleaving layer at the DSL device. The two means both have disadvantages. For the first means, if the above retransmission mechanism is configured in a layer below the FEC coding layer and the interleaving layer at the DSL device, as long as an error occurs to the transmitted packet, the error can be found through CRC and a retransmission is initiated. At this time, the packets received on the FEC coding layer and the interleaving layer at the DSL device nearly have no error, and thus the capacities of FEC coding layer and the interleaving layer are not brought into play. For the second means, if the retransmission mechanism is configured in a layer above the FEC coding layer and the interleaving layer at the DSL device, when a packet is transmitted to the FEC coding layer and the interleaving layer, errors in the packet are scattered to raise the error correction rate. If the errors in the packet exceed the error correction capability, due to error interleaving and scattering, the retransmission layer initiates more packet retransmissions, and thus more packets are retransmitted. Meanwhile, due to the interleaving delay, the retransmission request initiated by the retransmission layer has a great delay, so that the retransmission layers at the sending end and the receiving end require an even larger cache. Particularly, in order to resist large impulse noises at the DSL device, a great interleaving delay may occur, and the interleaving memory reaches 64 Kb/128 Kb. When the impulse noises are difficult to resist, the error packets resulted from the impulse noises will be spread to a large scope, so that more error packets need to be retransmitted, and the retransmission efficiency decreases.

In view of the above, when the retransmission mechanism is introduced at the DSL device running in the multi-pulse noise environment, if the interleaving technique is not used and only the FEC coding technique is adopted, the error correction capability of the FEC coding layer will be greatly reduced. Meanwhile, when the retransmission mechanism is introduced at the DSL device running in the multi-pulse noise environment, if neither the FEC coding technique nor the interleaving technique is adopted and only the retransmission mechanism is employed to ensure the correctness of the received packet, the receiving efficiency of the whole system will be decreased as the FEC coding technique is capable of not only performing error correction but also providing a 3 db coding gain.

SUMMARY

The embodiments of the present invention provide a method for retransmitting data, in which forward error correction (FEC) and interleaving technologies are integrated so as to bring the maximum capacities of the FEC and interleaving technologies into full play.

The embodiments of the present invention also provide a system for retransmitting data, in which the FEC and interleaving technologies are satisfactorily integrated so as to be fully utilized.

The embodiments of the present invention further provide a device for retransmitting data, in which the FEC and interleaving technologies are satisfactorily integrated so as to bring the maximum capacities of the FEC and interleaving technologies into full play.

A method for retransmitting data is provided in embodiments of the present invention. The method includes the following steps:

A: A receiving device detects a received frame that bears data, determines whether the data frame is damaged or not, and judges whether the number of damaged frames in a set range meets a set retransmission threshold value. If yes, Step B is performed. Otherwise, Step C is performed.

B: The receiving device sends a retransmission request to a sending device, and the sending device retransmits the frame. The process turns to Step A.

C: The receiving device caches the received data for the subsequent decoding process.

A system for retransmitting data is also provided in embodiments of the present invention. The system includes the followings devices.

A sending device is adapted to send a frame that bears data to the receiving device and cache data corresponding to a frame number; and after receiving a retransmission request carrying the frame number, bear the cached data corresponding to the frame number carried in the retransmission request in a frame and retransmit the frame.

A receiving device is adapted to receive a frame sent from the sending device and detect to determine whether the frame is damaged; when the number of the damaged frames received in a set range reaches a set retransmission threshold value, carry a frame number corresponding to the received frame in the retransmission request and send the request to the sending device. Otherwise, perform FEC coding and interleaving processing on the data borne by the received frame.

A receiving device for retransmitting data is also provided in embodiments of the present invention. The device includes the following modules.

A transceiver module is adapted to send a received frame to a detecting module, and send a retransmission request carrying a frame number received from the detecting module.

The detecting module is adapted to receive the frame sent by the transceiver module and detect to determine whether the frame is damaged. When the number of the damaged frames received in a set range reaches a set retransmission threshold value, carry the frame number corresponding to the received frame in the retransmission request and send the request to the transceiver module. Otherwise, send the data borne by the received frame to an uploading module.

The uploading module is adapted to send the data received from the detecting module to an upper layer of the receiving device to perform FEC coding and interleaving processing on the data.

A sending device for retransmitting data is further provided in embodiments of the present invention. The device includes the following modules.

A storing module is adapted to store a sent data corresponding to a frame number.

A data frame generating module is adapted to generate a frame that bears data after obtaining the data to be sent, store the data corresponding to the frame number in the storing module, and send the frame to a transceiver module. After receiving a retransmission request carrying the frame number sent by the transceiver module, obtain the data corresponding to the frame number from the storing module and generate a frame that bears the data. Store the data corresponding to the set frame number in the storing module, and send the frame to the transceiver module.

The transceiver module is adapted to send the frame received from the data frame generating module, receive the retransmission request carrying the frame number, and send the request to the data frame generating module.

Seen from the above embodiments of the present invention, a new retransmission mechanism is introduced at the DSL device running in a multi-pulse noise environment. According to the mechanism, a discrete multi-tone modulation (DMT) symbol that bears data is detected to determine whether the DMT symbol is damaged or not, and then it is judged whether the data borne by the DMT symbol needs to be retransmitted or not according to the error correction capability of the system. Further, a retransmission threshold value is set to ensure that during the retransmission, the errors do not exceed the correction range of the FEC coding and interleaving technologies of the system. When the number of the error DMT exceeds the retransmission threshold value, only the data borne by the damaged DMT received the most lately is retransmitted, so that the retransmission is satisfactorily integrated with the FEC and interleaving technologies. When the retransmission threshold value is equal to the maximum capabilities of the FEC coding and interleaving technologies, the maximum capabilities of the FEC coding and interleaving technologies can be brought to their full play. Therefore, the method, system, and devices provided by the embodiments of the present invention may satisfactorily integrate the FEC and interleaving technologies, so as to bring the maximum capacities of the FEC and interleaving technologies into full play to improve the efficiency of the system.

BRIEF DESCRIPTION OF THE DRAWINGS

FIG. 3 is a schematic view of a DSL device configured with a retransmission layer according to an embodiment of the present invention;

FIG. 4 is a schematic view illustrating the structure of a DTM symbol frame according to an embodiment of the present invention;

FIG. 5 is a schematic view of a sending FIFO cached queue according to an embodiment of the present invention;

DETAILED DESCRIPTION

Figure 1:
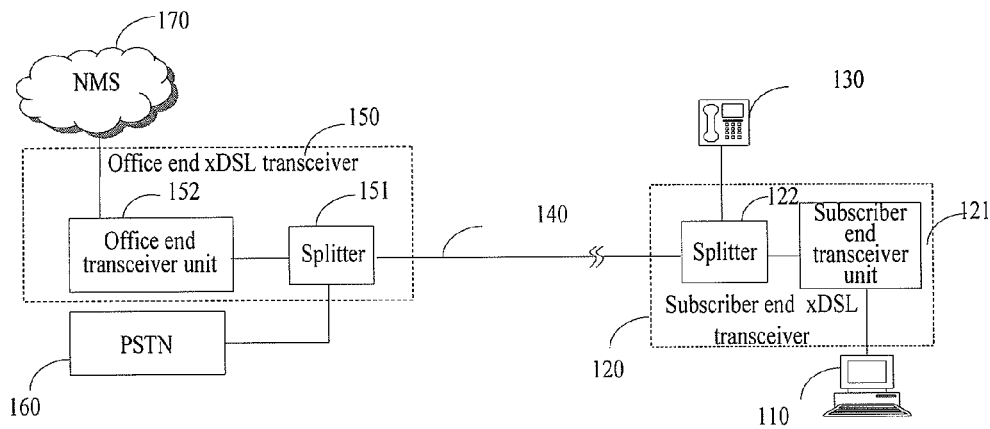
FIG. 1 is a schematic view of a prior DSL system.

In order to make the aforementioned and other objectives, technical solutions, and advantages of the present invention comprehensible, embodiments accompanied with figures are described in detail below.

In the embodiments of the present invention, a retransmission mechanism is introduced. In a retransmission request of the retransmission mechanism, a packet to be retransmitted is not identified by a packet ID, but by a frame number such as the identifier of a DMT symbol, a DMT frame, or an OFDM symbol that bears data (the DMT symbol, DMT frame, or OFDM symbol that each bears data has a respective frame number). When data is to be retransmitted, the DMT data identified by the identifier of the DMT symbol needs to be retransmitted. Therefore, as the retransmission mechanism is directed to the DMT symbol instead of the packet, when the packet that bears data is seriously damaged by noises or even the carried packet ID is damaged, the data to be retransmitted is determined according to the identifier of the DMT symbol.

In the embodiments of the present invention, a retransmission layer having a retransmission mechanism is configured at the DSL device. The retransmission layer is configured in a layer below the FEC coding layer and the interleaving layer, and a retransmission threshold value is set. When the number of the damaged DMT symbols counted in a set range is larger than the set retransmission threshold value, the retransmission layer initiates the retransmission of the damaged DMT symbols that is received. If the number of the damaged DMT symbols is smaller than or equal to the set retransmission threshold value, the retransmission layer directly sends the received data borne in the DMT symbol (even if the DMT symbol has already been damaged) to the FEC coding layer and the interleaving layer for error correction coding processing and interleaving processing, respectively.

In the embodiments of the present invention, the set range may be a span of error correction capabilities of one Reed-Solomon (RS) code of the FEC coding layer. In the embodiments of the present invention, the retransmission threshold value may be set as a current INP value of the DSL device. The number of the error DMT symbols smaller than or equal to the set retransmission threshold value falls in the combined error correction capability of error correction coding and interleaving respectively performed by the FEC coding layer and the interleaving layer, so that the error can be corrected. Therefore, the FEC coding layer and the interleaving layer are fully utilized at the DSL device.

In the embodiments of the present invention, the retransmission layer is configured in a layer below the FEC coding layer and the interleaving layer at the DSL device, and the DMT symbol that bears data to be retransmitted is not scattered by the interleaving layer, so the data retransmission efficiency is ensured.

In the embodiments of the present invention, an impulse noise detector (IND) configured at the DSL device may be adopted to detect whether the DMT symbol received by the DSL device has an error or not. In addition, checking the CRC may also be available for use by the DSL device to detect whether the DMT symbol received by the DSL device has an error or not.

Figure 2:
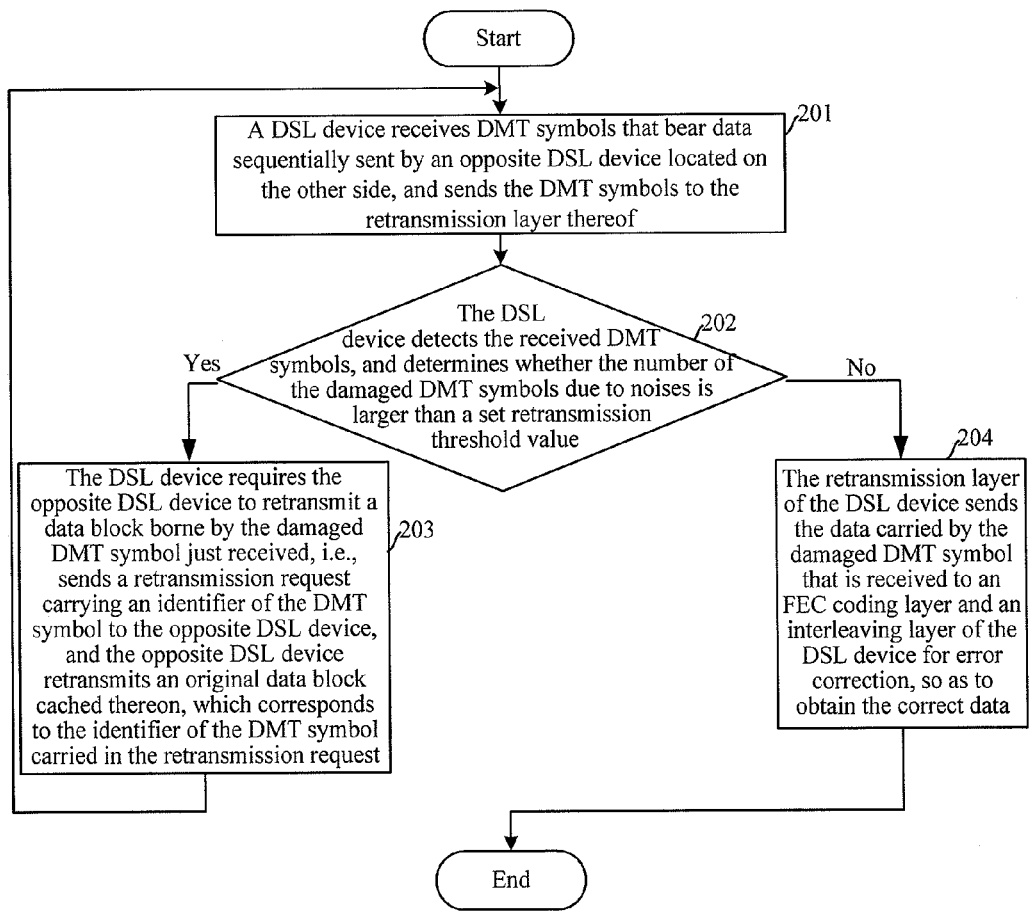
FIG. 2 is a flow chart of a method for retransmitting data according to an embodiment of the present invention.

FIG. 2 is a flow chart of a method for retransmitting data according to an embodiment of the present invention. The method includes the following steps.

In Step 201, a DSL device receives DMT symbols that bear data sequentially sent by an opposite DSL device located on the other side, and sends the DMT symbols to the retransmission layer thereof.

In Step 202, the DSL device detects the DMT symbols when receiving them, counts the number of damaged DMT symbols due to noises in a set range, and determines whether the number of the damaged DMT symbols due to noises is larger than a set retransmission threshold value. If yes, Step 203 is performed. Otherwise, Step 204 is performed.

In this embodiment, the set range is a span of one RS code or smaller than the span of one RS code, and the set retransmission threshold value is an INP value or smaller than the INP value.

In Step 203, the DSL device requires the opposite DSL device to retransmit a data block borne by the damaged DMT symbol just received, that is, sends a retransmission request carrying an identifier of the DMT symbol to the opposite DSL device, and the opposite DSL device retransmits an original data block cached thereon, which corresponds to the identifier of the DMT symbol carried in the retransmission request. Afterward, the process turns to Step 201.

In this embodiment, the identifier of the DMT symbol may actually be a frame number.

In Step 204, the retransmission layer of the DSL device sends the data carried by the damaged DMT symbol that is received to an FEC coding layer and an interleaving layer of the DSL device for error correction, so as to obtain the correct data.

The method in FIG. 2 is illustrated in detail below.

In this embodiment, the retransmission layer is configured between a physical media specific-transmission convergence (PMS-TC) layer and a physical media dependent (PMD) layer of the DSL device, as shown in FIG. 3. The PMS-TC layer has FEC coding and interleaving functions, i.e., includes the FEC coding layer and the interleaving layer.

In this embodiment, all the sent data has to pass the retransmission layer, and a data frame format of the retransmission layer is shown in FIG. 4, which includes a data block ID (DBID), an RRC, and a Bearer data. The DBID is a data block identifier borne by a DMT symbol, the RRC is a retransmission request channel (the RRC can be omitted if the retransmission request is transmitted via an EOC channel), and the Bearer data bears data of an upper layer. The amount of data borne by one frame on the retransmission layer is the amount of data bearable to one DMT symbol (with the spending of the trellis coding being excluded, if a dual-delay channel exists, the amount of data borne by one frame on the retransmission layer is the amount of data bearable to one DMT symbol on the delay channel). One DMT symbol can only bear one retransmitted frame. In this manner, the frames on the retransmission layer are corresponding to the DMT symbols one by one, and thus one following frame on the retransmission layer can be referred to as one DMT symbol.

The DSL device has to receive or send data through the configured retransmission layer, and the sending and receiving of the DSL device in the present invention are illustrated in detail below.

When the DSL device sends data, the circumstance is as follows.

After the retransmission layer of the DSL device receives, from an upper layer (i.e., the PMS-TC layer, the data to be sent, it firstly bears the data in a frame on the retransmission layer, assigns one DBID for the data block, and adds the DBID to a DBID field of the frame on the retransmission layer. It then sends the frame on the retransmission layer to a lower layer (i.e., the PMD layer), and caches the frame on the retransmission layer into a sending first-in-first-out (FIFO) cached queue configured in the retransmission layer or in other layers for potential retransmission request. Finally, the PMD layer of the DSL device sends the frame on the retransmission layer by using one DMT symbol.

In this embodiment, when the PMD layer sends the DMT symbol, the PMD layer obtains a DMT identifier (DMT_ID). The DMT_ID is obtained according to a count value counted by a sending counter at the DSL device, for example, the last few digits of the count value or a modulus operation performed on the count value may be adopted. In the sending FIFO cached queue, each DMT symbol has a DMT_ID which is obtained by the PMD layer. The sending FIFO cached queue is shown in FIG. 5. The DMT_ID identifies the DMT symbol that bears the data block, and is adapted to designate which data block carried by the DMT symbol needs to be retransmitted. The DBID is the identifier of the data block carried by the DMT symbol, and is mainly adapted to restore the sequence of the borne data instead of designating which data block needs to be retransmitted in the retransmission request. RFlag is adapted to indicate whether the data block carried by the frame on the retransmission layer has been retransmitted or not, that is, whether the DMT symbol (i.e., the data block) is sent for retransmission or not. Data Block is adapted to store the data block carried by the DMT symbol.

Figure 6:
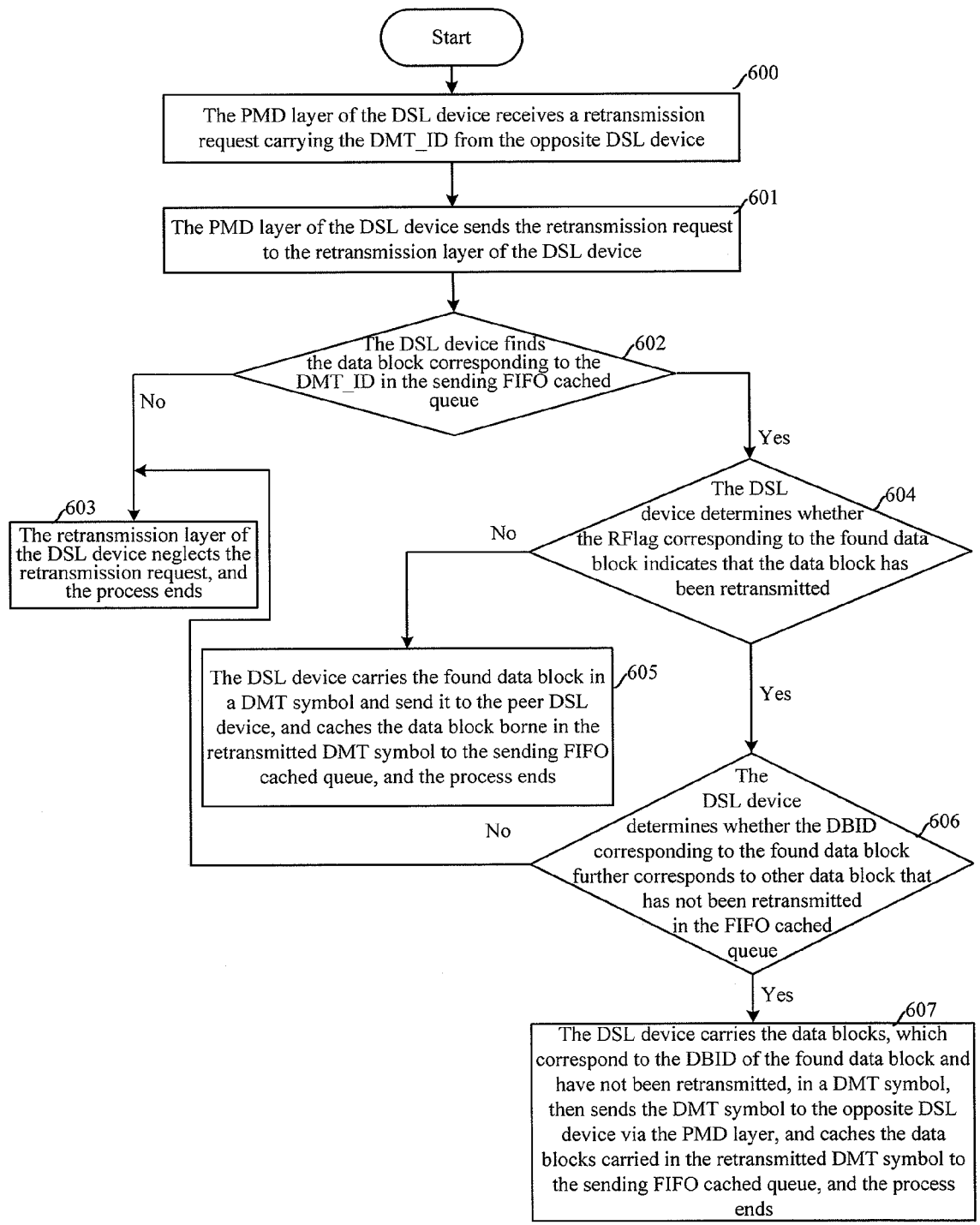
FIG. 6 is a flow chart of a method for receiving a retransmission request by a DSL device according to an embodiment of the present invention.

In this embodiment, after the DSL device receives the retransmission request, the specific implementation is shown in FIG. 6.

In Step 600, the PMD layer of the DSL device receives a retransmission request carrying the DMT_ID from the opposite DSL device.

In this embodiment, the opposite DSL device also has a receiving counter, which is adapted to count the received DMT symbol, and obtain the DMT_ID of the received DMT symbol according to the count value. As the counting manner of the counter is the same as that of the counter at the DSL device that sends the DMT symbol, and the rules for obtaining the DMT_IDs according to the count value at the sending and the receiving sides are identical, for one DMT symbol, the DMT_IDs thereof at the sending and the receiving DSL devices are the same.

In Step 601, the PMD layer of the DSL device sends the retransmission request to the retransmission layer of the DSL device.

In Step 602, the retransmission layer of the DSL device finds the data block corresponding to the DMT_ID in the sending FIFO cached queue according to the DMT_ID carried in the retransmission request. If the data block is found, Step 604 is performed. Otherwise, Step 603 is performed.

In Step 603, the retransmission layer of the DSL device neglects the retransmission request, and the process ends.

In Step 604, the retransmission layer of the DSL device determines whether the RFlag corresponding to the found data block indicates that the data block has been retransmitted, and if not, Step 605 is performed. Otherwise, Step 606 is performed.

In Step 605, the DSL device retransmits the data block in the retransmitted frame, and caches the retransmitted frame to the sending FIFO cached queue as well as the corresponding DMT_ID, RFlag, and DBID.

In Step 606, the retransmission layer of the DSL device determines whether the DBID corresponding to the found data block further corresponds to other data block that has not been retransmitted in the FIFO cached queue (determines according to the RFlag of the data block), and if yes, Step 607 is performed. Otherwise, Step 603 is performed.

In this embodiment, if the determination result of the above step is negative, the frame sent by the data block for the first time is moved out of the sending FIFO cached queue. That is, the frame sent by the data block for the first time is not in the window, so the request could be neglected.

In Step 607, the retransmission layer of the DSL device carries the data blocks, which correspond to the DBID of the found data block and have not been retransmitted, in a DMT symbol, then sends the DMT symbol to the opposite DSL device via the PMD layer, and caches the data blocks carried in the retransmitted DMT symbol to the sending FIFO cached queue. The data blocks have correspondence with the DMT_ID, the RFlag indicating that the DMT symbol has been retransmitted, and the DBID.

When the DSL device receives packets, the circumstance is as follows.

Figures 7, 8, 9, 10:
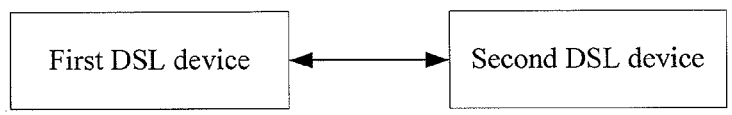
FIG. 7 is a schematic view of a receiving FIFO cached queue according to an embodiment of the present invention.
FIG. 8 is a schematic view showing a format of a retransmission judging queue according to an embodiment of the present invention.
FIG. 9 is a schematic view of a receiving FIFO cached queue according to a preferred embodiment of the present invention.
FIG. 10 is a schematic view of a system for retransmitting data according to an embodiment of the present invention.

When the DSL device receives the DMT symbols, a receiving FIFO cached queue needs to be configured for the data blocks carried by the received DMT symbols for caching, and then sequentially sends the data blocks from the FIFO cached queue to the upper layer for processing. The cached queue is configured in the retransmission layer or in any other layer of the DSL device, and the capacity of the cached queue is equal to that of the configured sending FIFO cached queue. In the receiving FIFO cached queue, the result detected by the DSL device about whether the received DMT symbol is damaged or not is stored corresponding to the DMT symbol. The receiving FIFO cached queue is shown in FIG. 7. The DMT_ID is an ID configured for the received DMT symbol and this ID comes from the count value obtained by counting the received DMT symbol by the counter (in which the last few digits of the count value are adopted or a modulus operation is performed on the count value), and the rule of configuring the DMT_ID is the same as that of assigning the DMT_ID for the sending DMT symbol. DBID is a value obtained from the DBID field of the DMT symbol. Degraded flag is a result of detecting whether the received DMT symbol is damaged or not, and if it is detected that the DMT symbol is seriously damaged, the Degraded flag is marked as 1/0. If it is detected that the DMT symbol is not damaged, the Degraded flag is marked as 0/1. Data Block is a data block borne by the DMT symbol.

When the retransmission layer of the DSL device receives the DMT symbol sent by the opposite DSL device via the PMD layer and detects that the received symbol is not damaged and the DBID value thereof is not a desired DBID (when the opposite DSL device sends a new data block, the configured DBID is in a certain order), the DMT symbol is a retransmitted DMT symbol. Thereby, the position of the corresponding DMT symbol in the receiving FIFO cached queue can be found according to the sequence of the DBID value, afterward the corresponding DMT symbol is replaced with the data block borne by the DMT symbol, and the DMT symbol is then deleted.

At the DSL device, a retransmission judging queue is also configured. The queue is an FIFO queue with a length equal to that of a set range, for example, the number of the DMT symbols spanned by the RS code, and this queue records whether the received DMT symbol is seriously damaged or not. The DMT symbols corresponding to the queue may be partly within the configured receiving FIFO cached queue, and partly sequentially sent to the PMS-TC layer of the DSL device from the receiving FIFO cached queue (when the number of the cached DMT symbols in the receiving FIFO cached queue is smaller than the number of the DMT symbols spanned by the set range). FIG. 8 is a schematic view showing a format of the retransmission judging queue. Referring to FIG. 8, when it is detected that the received DMT symbol is seriously damaged, a value indicating that the symbol is damaged is input, for example, 1, and when it is detected that the received DMT symbol is not seriously damaged, a value indicating that the symbol is not seriously damaged is input, for example, 0. At the DSL device, a retransmission counter is adapted to count the number of the DMT symbols in the retransmission judging queue that are seriously damaged. When the input and output values of the retransmission judging queue are identical, the count value of the retransmission counter is constant. When the retransmission judging queue inputs a value indicating that the symbol is not damaged, and outputs a value indicating that the symbol is damaged, the count value of the retransmission counter is subtracted by 1. When the queue inputs a value indicating that the symbol is damaged, and outputs a value indicating that the symbol is not damaged, the count value of the retransmission counter is added by 1. When the queue only inputs and inputs the value indicating that the symbol is not damaged, the count value of the retransmission counter is constant. When the queue only inputs and the value inputted indicates that the symbol is damaged, the count value of the retransmission counter is added by 1.

When the count value of the retransmission counter is added by 1, the count value is compared with the set retransmission request threshold value. If the count value is larger than the threshold value, a retransmission is requested, and if the count value is smaller than or equal to the threshold value, the retransmission is not requested, but the FEC coding and interleaving technologies are employed to correct the data block carried in the damaged DMT symbol that is received.

In the embodiment of the present invention, the retransmission request threshold value may be set as 1, and at this point, a retransmission is performed as long as the damaged DMT symbol is received. Or, the retransmission request threshold value may be set to be infinitely large, i.e., the retransmission mechanism is not needed, which is the same as the process of preventing the impact of multi-pulse noises by using the FEC coding and interleaving technologies in the conventional art.

In the embodiment of the present invention, as the DMT symbol that bears data may also be seriously damaged, it is impossible to distinguish whether the symbol is a retransmitted DMT symbol or a DMT symbol sent for the first time, so that it cannot determine right away whether to delete this DMT symbol or not. The retransmission layer of the DSL device cannot send the data block carried by the damaged DMT symbol to the above FEC coding layer and the interleaving layer for processing, and thus a serious error may occur. The reason is that the retransmission layer may send the data blocks carried by the DMT symbols to the upper layer, but cannot send the data blocks carried by the DMT symbols at a smaller or larger number to the upper layer.

Therefore, when submitting the data blocks, the DSL device should delete the redundant damaged data blocks, i.e., the data blocks carried by the damaged retransmitted DMT symbols. In one deleting means, the DBID in the receiving end FIFO is a desired DBID. When the DMT of the desired DBID and the DMT of the frame DBID being damaged are received into the receiving FIFO, the desired DBID is added by 1, and the DMT of the frame DBID being damaged is overlapped by an intact DMT, so that the redundant DMTs are deleted. Another deleting means is performed according to an orderly principle of the DBID corresponding to the new data block. If the DBID of the received DMT symbol is a DBID desired by the retransmission layer of the DSL device and passing the check of the retransmission threshold value, the data block carried by the symbol is directly submitted to the upper layer. If the sent DMT symbol is damaged, the DBID is invalid, and an undamaged DMT symbol should be found forward to determine how many retransmitted DMT symbols exist between them according to the corresponding DBID. The formula is as follows. It is assumed that the DBID of the DMT symbol desired by the retransmission layer of the DSL device is n, and the DBID of the undamaged DMT symbol found forward is m, so that m-n DMT symbols there-between are DMT symbols sent for the first time, the rest are retransmitted DMT symbols, and the DMT symbols of a redundant number are deleted randomly. In this manner, though which DMT symbol is retransmitted and which DMT symbol is sent for the first time cannot be distinguished, as the DMT symbols are all damaged, the data blocks borne thereby have not much meaning. When the check of the retransmission threshold value is passed, the FEC coding layer and the interleaving layer are adapted for correction. Therefore, the retransmission layer at the DSL device just needs to send data blocks to the upper layer at a proper number, no less and no more. That is, randomly m-n DMT symbols are considered as DMT symbols sent for the first time, and the rest are considered as retransmitted DMT symbols.

A specific embodiment is provided below as an example for illustration. FIG. 9 is a schematic view of a receiving FIFO cached queue according to a preferred embodiment of the present invention, in which the left side of the queue is for input, and the right side of the queue is for output, i.e., the data block is sent to the upper layer of the retransmission layer of the DSL device.

Initially, the desired value of the DBID of the received DMT symbol is 1, the DBID of the actually received DMT symbol is 1 and is not damaged, then the data block borne by the DMT symbol is sent to the upper layer. Next, the desired value of the DBID of the received DMT symbol is 2, the DBID of the actually received DMT symbol is 2 and is not damaged, then the data block borne by the DMT symbol is sent to the upper layer. Next, the desired value of the DBID of the received DMT symbol is 3, the actually received DMT symbol is damaged, and the DBID thereof is invalid, so that the first DMT symbol that is received and is not damaged should be found forward. If the DBID of the first received undamaged DMT symbol is 4, 4−3=1, one DMT symbol there-between is sent for the first time. In fact, only one DMT symbol exists there-between which is sent for the first time instead of being retransmitted, and the data block carried thereby is sent to the upper layer. Next, the desired value of the DBID of the received DMT symbol is 4, it is a case quite easy to handle. Next, the desired value of the DBID of the received DMT symbol is 5, the actually received DMT symbol is damaged, and the DBID thereof is invalid. There is a need for finding forward to find the DBID of the first received undamaged DMT symbol is 6, 6−5=1. Only one DMT symbol there-between is sent for the first time. However, in fact, two DMT symbols are received there-between, so that it can be obtained that one retransmitted DMT symbol is damaged, and the other is sent for the first time. Therefore, one DMT symbol (for example, DMT_ID=5) is designated as being sent for the first time, and the data block borne thereby is sent to the upper layer; and the other (for example, DMT_ID=6) is designated as being retransmitted, and then is deleted. If m-n is larger than 1, data blocks carried by m-n DMT symbols should be sent to the upper layer.

In an embodiment of the present invention, a system for retransmitting data is provided, as shown in FIG. 10. FIG. 10 is a schematic view of a system for receiving data correctly according to an embodiment of the present invention. The system includes a first DSL device and a second DSL device.

The first DSL device is adapted to send DMT symbols that bear data to the second DSL device and cache the sent data blocks as well as related information thereof, and after receiving a retransmission request carrying a DMT_ID, the first DSL device is adapted to bear the cached data corresponding to the DMT_ID carried in the request in the DMT symbol, and then retransmit the data.

The second DSL device is adapted to receive and detect the DMT symbols sent by the first DSL device. When the number of the damaged DMT symbols received in a set range reaches a set retransmission threshold value, carry the DMT_ID corresponding to the most lately received DMT symbol in the retransmission request and send the request to the first DSL device. Otherwise, perform an FEC coding and interleaving processing on the data borne by the received DMT symbol.

In the above system, the first DSL device further includes the following modules.

A storing module is adapted to store the sent data corresponding to the DMT_ID.

A DMT symbol generating module is adapted to obtain the data to be sent from an upper layer of the DSL device, generate a DMT symbol that bears data, store the data corresponding to the DMT_ID in the storing module, and send the DMT symbol to a transceiver module. To obtain the data corresponding to the DMT_ID from the storing module after receiving the retransmission request sent by the transceiver module, generate a DMT symbol that bears data, store the data corresponding to the DMT_ID in the storing module, and send the DMT symbol to the transceiver module.

The transceiver module is adapted to send the DMT symbol received from the DMT symbol generating module to the second DSL device, receive the retransmission request carrying the DMT_ID sent by the second DSL device, and send the request to the DMT symbol generating module.

The second DSL device further includes the following modules.

A transceiver module is adapted to send the DMT symbol received from the first DSL device to a detecting module, and send the retransmission request received from the detecting module to the first DSL device.

The detecting module is adapted to receive and detect the DMT symbol sent by the transceiver module, when the number of the damaged DMT symbols received in a set range reaches the set retransmission threshold value, carry the DMT_ID corresponding to the received DMT symbol in the retransmission request and send the request to the transceiver module. Otherwise, send the data borne by the received DMT symbol to an uploading module.

The uploading module is adapted to send the data received from the detecting module to the upper layer of the device to perform FEC coding and interleaving processing on the data.

Figure 11:
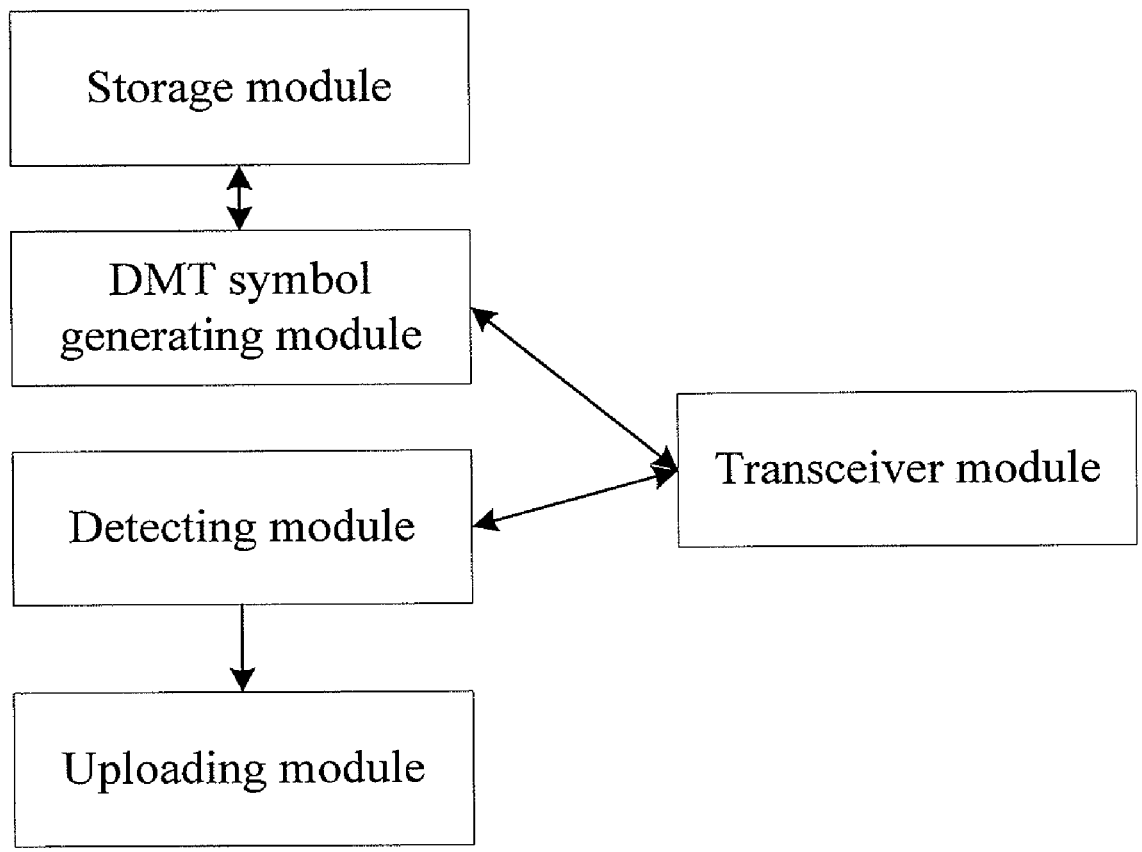
FIG. 11 is a schematic view of a device for retransmitting data according to an embodiment of the present invention.

In an embodiment of the present invention, a device for retransmitting data is provided, as shown in FIG. 11. FIG. 11 is a schematic view of a device for receiving data correctly according to an embodiment of the present invention. The device includes a transceiver module, a detecting module, an uploading module, a storing module, and a DMT symbol generating module.

The storing module is adapted to store the sent data corresponding to the DMT_ID.

The DMT symbol generating module is adapted to obtain the data to be sent from an upper layer of the DSL device, generate a DMT symbol that bears the data, store the data corresponding to the DMT_ID in the storing module, and send the DMT symbol to the transceiver module. To obtain the data corresponding to the DMT_ID from the storing module after receiving the retransmission request sent by the transceiver module, generate a DMT symbol that bears data, store the data corresponding to the DMT_ID in the storing module, and send the DMT symbol to the transceiver module.

The transceiver module is adapted to send the DMT symbol received from the DMT symbol generating module to an opposite device, receive a retransmission request carrying the DMT_ID from the opposite device, and send the request to the DMT symbol generating module; to send the DMT symbol received from the opposite device to the detecting module, and send the retransmission request received from the detecting module to the opposite device.

The detecting module is adapted to receive and detect the DMT symbol sent by the transceiver module, when the number of the damaged DMT symbols received in a set range reaches the set retransmission threshold value, carry the DMT_ID corresponding to the received DMT symbol in the retransmission request and send the request to the transceiver module. Otherwise, send the data borne by the received DMT symbol to the uploading module.

The uploading module is adapted to send the data received from the detecting module to the upper layer of the device to perform FEC coding and interleaving processing on the data.

The detecting module further includes an IND, and the detection is performed by the IND.

Seen from the above embodiments of the present invention, when the data block is seriously damaged due to multi-pulse noises, a request of retransmitting data can still be sent to request to retransmit the DMT symbol that carries data. In the embodiments of the present invention, the retransmission mechanism is organically integrated with the existing FEC coding and interleaving technologies, so as to ensure the data to be received correctly without affecting the data receiving efficiency.

In the embodiments of the present invention, the DSL device may be substituted by other data receiving devices having the FEC coding and interleaving technologies, for example, Wi-Fi, Wimax, and 3G devices based on the OFDM technology. The application environment of the present invention is not limited to the multi-pulse noise environment, but may be other environments that may damage data during the data transmission. Further, the DMT symbol may also be substituted by other data frames that bear data.

Through the description of the above embodiments, persons in the art may easily figure out that the present invention can be implemented by using software on an essential general hardware platform, or implemented by using hardware. In many cases, the former is more preferred. Based on the above understanding, the substance of the technical solutions of the present invention or the part thereof that contributes to the conventional art can be realized in the form of a software product. The computer software product is stored in a storage medium, and includes several instructions to make a computer device (for example, a personal computer, a server, or a network device) to execute methods provided in the embodiments of the present invention.

It will be apparent to those skilled in the art that various modifications and variations can be made to the structure of the present invention without departing from the scope of the invention. In view of the foregoing, it is intended that the present invention cover modifications and variations of this invention provided they fall within the scope of the following claims and their equivalents.

What is claimed is:

1. A method for retransmitting data, comprising:
   receiving, at a receiving device, a plurality of discrete multi-tone (DMT) symbols bearing data from a sending device;
   detecting, at the receiving device, the plurality of DMT symbols to determine that a quantity of damaged DMT symbols in a set range meets a set retransmission threshold value;
   sending, from the receiving device to the sending device a retransmission request for requesting the sending device retransmit one of the damaged DMT symbols, the retransmission request carrying an identifier of the one of the damaged DMT symbols; and
   receiving, at the receiving device, a DMT symbol carrying data corresponding to the identifier of the one of the damaged DMT symbols;
   wherein determining the number of the damaged DMT symbols in the set range meets the set retransmission threshold value further comprising:
      setting a retransmission judging queue at a length same as a length of the set range;
      sequentially storing a detection result indicative of whether each of the plurality of DMT symbols is damaged or not;
      determining the quantity of the damaged DMT symbols by utilizing a set retransmission counter to count the number according to the detection result stored in the retransmission judging queue; and
      determining the count value is larger than the set retransmission threshold value.

2. The method according to claim 1, wherein the set range is equal to or smaller than a span of error correction capabilities of a Reed-Solomon (RS) code of forward error correction coding.

3. The method according to claim 2, the method further comprising:
   determining, at the receiving device, the damaged DMT symbol is a damaged retransmitted DMT symbol; and
   deleting, at the receiving device, the damaged retransmitted DMT symbol.

4. The method according to claim 3, wherein the determining the damaged DMT symbol is a damaged retransmitted DMT symbol comprises:
   determining whether a data block identifier (DBID) of the damaged DMT symbol is damaged or not,
      if the DBID of the damaged DMT symbol is not damaged, determining whether the DBID of the damaged DMT symbol is a desired DBID; and
      if the DBID of the damaged DMT symbol is damaged, finding data borne in a DMT symbol nearest to the damaged DMT symbol from the data borne in the received DMT symbols cached by the receiving device,
   determining whether a difference obtained by subtracting a DBID of the DMT symbol nearest to the damaged DMT symbol from the DBID of the damaged DMT symbol desired to be received is equal to the number between the damaged DMT symbol and the nearest DMT symbol.

5. The method according to claim 2, wherein after determining that a received DMT symbol is damaged, the method further comprises:
   determining, at the receiving device, whether the DBID of the data borne by a DMT symbol at the tail of a cached queue caching the received DMT symbols is legitimate or not and is desired or not, and
      if the received DMT symbols are legitimate and desired, submitting the data to an upper layer;
      if the received DMT symbols are not legitimate and desired, then finding forward data borne by a nearest undamaged DMT symbol in the cached queue, adopting a difference between a DBID of the data borne by the nearest undamaged DMT symbol and the desired DBID as the number of the damaged retransmitted DMT symbol between the data borne by the nearest undamaged DMT symbol and the data borne by the DMT symbol at the tail of the cached queue, and then randomly deleting DMT symbols of a determined number between the nearest undamaged DMT symbol and the DMT symbol at the tail.

6. The method according to claim 1, wherein the retransmission threshold value is equal to or smaller than an impulse noise protection (INP) value of the system.

7. The method according to claim 1, further comprising:
receiving, at the sending device, the retransmission request; finding, at the sending device, data corresponding to the identifier of the damaged DMT symbol from the cache according to the identifier of the damaged DMT symbol carried in the received retransmission request;
encapsulating, at the sending device, the data and the identifier of the damaged DMT symbol into the DMT symbol, and
sending, at the sending device, the DMT symbol carrying the identifier of the damaged DMT symbol to the receiving device.

8. The method according to claim 7, further comprising: determining, at the sending device, the retransmission request carrying the identifier of the damaged DMT symbol is not received; receiving data from an upper layer; assigning a DBID of the data; and encapsulating the data into a retransmitted DMT symbol for sending.

9. The method according to claim 7, wherein the finding the data corresponding to the identifier of the damaged DMT symbol from the cache comprises:
finding, from the cache, the data corresponding to the identifier of the damaged DMT symbol in the retransmission request; judging the data has been retransmitted; and
finding, from the cache, the data having the DBID of the corresponding data but not borne by the retransmitted DMT symbol according to the DBID of the corresponding data.

10. The method according to claim 7, wherein the identifier of the damaged DMT symbol carried in the retransmission request is obtained by counting the received DMT symbols by a receiving counter of the receiving device.

11. A method for retransmitting data, comprising:
receiving, at a receiving device, a plurality of discrete multi-tone (DMT) symbols bearing data from a sending device;
detecting, at the receiving device, the plurality of DMT symbols to determine that a quantity of damaged DMT symbols in a set range meets a set retransmission threshold value;
sending, from the receiving device to the sending device a retransmission request for requesting the sending device retransmit one of the damaged DMT symbols, the retransmission request carrying an identifier of the one of the damaged DMT symbols; and
receiving, at the receiving device, a DMT symbol carrying data corresponding to the identifier of the one of the damaged DMT symbols;
determining, at the receiving device, the damaged DMT symbol is a damaged retransmitted DMT symbol; and
deleting, at the receiving device, the damaged retransmitted DMT symbol;
wherein determining the damaged DMT symbol is a damaged retransmitted DMT symbol comprises:
determining whether a data block identifier (DBID) of the damaged DMT symbol is damaged or not, if the DBID of the damaged DMT symbol is not damaged, determining whether the DBID of the damaged DMT symbol is a desired DBID;
and if the DBID of the damaged DMT symbol is damaged, finding data borne in a DMT symbol nearest to the damaged DMT symbol from the data borne in the received DMT symbols cached by the receiving device,
determining whether a difference obtained by subtracting a DBID of the DMT symbol nearest to the damaged DMT symbol from the DBID of the damaged DMT symbol desired to be received is equal to the number between the damaged DMT symbol and the nearest DMT symbol.

12. A method for retransmitting data, comprising:
receiving, at a receiving device, a plurality of discrete multi-tone (DMT) symbols bearing data from a sending device;
detecting, at the receiving device, the plurality of DMT symbols to determine that a quantity of damaged DMT symbols in a set range meets a set retransmission threshold value;
sending, from the receiving device to the sending device a retransmission request for requesting the sending device retransmit one of the damaged DMT symbols, the retransmission request carrying an identifier of the one of the damaged DMT symbols; and
receiving, at the receiving device, a DMT symbol carrying data corresponding to the identifier of the one of the damaged DMT symbols;
wherein after determining that a received DMT symbol is damaged, the method further comprises:
determining, at the receiving device, whether the DBID of the data borne by a DMT symbol at the tail of a cached queue caching the received DMT symbols is legitimate or not and is desired or not, and if the received DMT symbols are legitimate and desired, submitting the data to an upper layer; if the received DMT symbols are not legitimate and desired, then finding forward data borne by a nearest undamaged DMT symbol in the cached queue, adopting a difference between a DBID of the data borne by the nearest undamaged DMT symbol and the desired DBID as the number of the damaged retransmitted DMT symbol between the data borne by the nearest undamaged DMT symbol and the data borne by the DMT symbol at the tail of the cached queue, and then randomly deleting DMT symbols of a determined number between the nearest undamaged DMT symbol and the DMT symbol at the tail.

13. A method for retransmitting data, comprising:
receiving, at a receiving device, a plurality of discrete multi-tone (DMT) symbols bearing data from a sending device; detecting, at the receiving device, the plurality of DMT symbols to determine that a quantity of damaged DMT symbols in a set range meets a set retransmission threshold value;
sending, from the receiving device to the sending device a retransmission request for requesting the sending device retransmit one of the damaged DMT symbols, the retransmission request carrying an identifier of the one of the damaged DMT symbols; and
receiving, at the receiving device, a DMT symbol carrying data corresponding to the identifier of the one of the damaged DMT symbols;

receiving, at the sending device, the retransmission request; finding, at the sending device, data corresponding to the identifier of the damaged DMT symbol from the cache according to the identifier of the damaged DMT symbol carried in the received retransmission request; and encapsulating, at the sending device, the data and the identifier of the damaged DMT symbol into the DMT symbol, and sending, at the sending device, the DMT symbol carrying the identifier of the damaged DMT symbol to the receiving device;

wherein finding the data corresponding to the identifier of the damaged DMT symbol from the cache comprises:

finding, from the cache, the data corresponding to the identifier of the damaged DMT symbol in the retransmission request; judging the data has been retransmitted; and finding, from the cache, the data having the DBID of the corresponding data but not borne by the retransmitted DMT symbol according to the DBID of the corresponding data.

* * * * *